United States Patent
Kim et al.

(10) Patent No.: US 10,182,410 B2
(45) Date of Patent: Jan. 15, 2019

(54) METHOD FOR TRANSMITTING D2D SYNCHRONIZATION SIGNAL AND TERMINAL THEREFOR

(71) Applicant: LG ELECTRONICS INC., Seoul (KR)

(72) Inventors: Youngtae Kim, Seoul (KR); Hanbyul Seo, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/509,469

(22) PCT Filed: Oct. 8, 2015

(86) PCT No.: PCT/KR2015/010658
§ 371 (c)(1),
(2) Date: Mar. 7, 2017

(87) PCT Pub. No.: WO2016/056857
PCT Pub. Date: Apr. 14, 2016

(65) Prior Publication Data
US 2017/0280403 A1    Sep. 28, 2017

Related U.S. Application Data

(60) Provisional application No. 62/062,108, filed on Oct. 9, 2014.

(51) Int. Cl.
*H04W 56/00* (2009.01)
*H04W 76/14* (2018.01)
(Continued)

(52) U.S. Cl.
CPC ......... *H04W 56/001* (2013.01); *H04W 8/005* (2013.01); *H04W 56/00* (2013.01); *H04W 76/14* (2018.02); *H04W 92/18* (2013.01)

(58) Field of Classification Search
None
See application file for complete search history.

(56) References Cited

U.S. PATENT DOCUMENTS

2015/0296469 A1* 10/2015 Yoon ................ H04W 56/0015
                                                  370/350
2016/0044618 A1*  2/2016 Sheng ................ H04W 56/002
                                                  370/329
(Continued)

FOREIGN PATENT DOCUMENTS

WO        2010082797        7/2010

OTHER PUBLICATIONS

PCT International Application No. PCT/KR2015/010658, Written Opinion of the International Searching Authority dated Jan. 26, 2016, 18 pages.
(Continued)

*Primary Examiner* — Otis L Thompson, Jr.
(74) *Attorney, Agent, or Firm* — Lee, Hong, Degerman, Kang & Waimey

(57) ABSTRACT

Disclosed is a method for transmitting a synchronization signal of device-to-device (D2D) communication. The method for transmitting a D2D synchronization signal of the present application may indicate the state of a terminal, the purpose of transmission of a primary D2D synchronization signal (PD2DSS), or whether to transmit a physical D2D shared channel (PD2DSCH), on the basis of an order in which root indexes of PD2DSSs are transmitted or the value of a root index used by a PD2DSS.

10 Claims, 10 Drawing Sheets

(51) Int. Cl.
*H04W 8/00* (2009.01)
*H04W 92/18* (2009.01)

(56) References Cited

U.S. PATENT DOCUMENTS

| 2017/0142678 | A1* | 5/2017 | Yoon | H04W 56/0015 |
| 2017/0231024 | A1* | 8/2017 | Matsumoto | H04W 76/023 |
| 2017/0273042 | A1* | 9/2017 | Shilov | H04W 56/002 |
| 2017/0332339 | A1* | 11/2017 | Yoon | H04W 56/0015 |

OTHER PUBLICATIONS

Huawei, "Design considerations for D2DSS", R1-135532, 3GPP TSG RAN WG1 Meeting #75, Nov. 2013, 5 pages.
LG Electronics, "On the Design of D2DSS and PD2DSCH", R1-140329, 3GPP TSG RAN Meeting #76, Feb. 2014, 6 pages.
Qualcomm Incorporated, "Signal Design for D2D Synchronization", R1-140462, 3GPP TSG RAN WG1 Meeting #76, Feb. 2014, 7 pages.
Research in Motion UK Ltd., "PSS/SSS Detection in Heterogeneous Networks", R1-112369, 3GPP TSG RAN WG1 Meeting #66, Aug. 2011, 6 pages.

* cited by examiner

METHOD FOR TRANSMITTING D2D SYNCHRONIZATION SIGNAL AND TERMINAL THEREFOR

CROSS-REFERENCE TO RELATED APPLICATIONS

This application is the National Stage filing under 35 U.S.C. 371 of International Application No. PCT/KR2015/010658, filed on Oct. 8, 2015, which claims the benefit of U.S. Provisional Application No. 62/062,108, filed on Oct. 9, 2014, the contents of which are all hereby incorporated by reference herein in their entirety.

TECHNICAL FIELD

The present invention relates to a wireless communication system, and more particularly, to a method for transmitting a Device-to-Device (D2D) synchronization signal and a terminal therefor

BACKGROUND ART

Recently, with the spread of smartphones and tablet PCs and activation of high-capacity multimedia communication, mobile traffic has significantly increased. Mobile traffic is expected to double every year. Since most mobile traffic is transmitted through a base station (BS), communication service operators are being confronted with serious network load. To process increasing traffic, communication operators have installed networks and accelerated commercialization of next-generation mobile communication standards, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between contiguous nodes without using infrastructure such as a BS. In a D2D communication environment, each node of a portable device, etc. searches for physically adjacent devices, configures a communication session, and transmits traffic. Since such D2D communication is being spotlighted as the technological basis of next-generation mobile communication after 4G due to ability thereof to cope with traffic overload by distributing traffic converging upon the BS. For this reason, a standardization institute such as 3rd generation partnership (3GPP) or institute of electrical and electronics engineers (IEEE) is establishing D2D communication standards based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

DISCLOSURE

Technical Problem

An object of the present invention devised to solve the problem lies in an efficient method for transmitting a D2D synchronization signal (D2DSS) in D2D communication.

Technical Solution

The object of the present invention can be achieved by providing a method for transmitting a Device-to-Device (D2D) synchronization signal by a terminal in a wireless communication system, the method including generating a first Primary D2D Synchronization Signal (PD2DSS) based on a first root index and generating a second PD2DSS based on a second root index different from the first root index, and transmitting the first PD2DSS and the second PD2DSS on different radio resources in one subframe, wherein a transmission order of the first PD2DSS and the second PD2DSS may indicate a state of the terminal, a transmission purpose of the first PD2DSS and the second PD2DSS, or transmission of a Physical D2D Shared Channel (PD2DSCH).

In another aspect of the present invention, provided herein is a method for transmitting a Device-to-Device (D2D) synchronization signal by a terminal in a wireless communication system, the method including generating two Primary D2D Synchronization Signals (PD2DSSs) based on a first root index set or a second root index set, and transmitting the two generated PD2DSSs on different radio resources in one subframe, wherein the first root index set may include a first root index and a second root index, and the second root index set may include a third root index and a fourth root index, wherein the two PD2DSSs may be generated based on one of the first root index set and the second root index set depending on a state of the terminal, a transmission purpose of the two PD2DSSs, or transmission of a Physical D2D Shared Channel (PD2DSCH).

In another aspect of the present invention, provided herein is a terminal for transmitting a Device-to-Device (D2D) synchronization signal, including a transceiver configured to transmit and receive a radio signal, and a processor configured to control the transceiver, wherein the processor is configured to generate a first Primary D2D Synchronization Signal (PD2DSS) based on a first root index and generate a second PD2DSS based on a second root index different from the first root index, and transmit the first PD2DSS and the second PD2DSS on different radio resources in one subframe, wherein a transmission order of the first PD2DSS and the second PD2DSS may indicate a state of the terminal, a transmission purpose of the first PD2DSS and the second PD2DSS, or transmission of a Physical D2D Shared Channel (PD2DSCH).

In another aspect of the present invention, provided herein is a terminal for transmitting a Device-to-Device (D2D) synchronization signal, including a transceiver configured to transmit and receive a radio signal, and a processor configured to control the transceiver, wherein the processor is configured to generate two Primary D2D Synchronization Signals (PD2DSSs) based on a first root index set or a second root index set, and transmit the two generated PD2DSSs on different radio resources in one subframe, wherein the first root index set may include a first root index and a second root index, and the second root index set may include a third root index and a fourth root index, wherein the two PD2DSSs may be generated based on one of the first root index set and the second root index set depending on a state of the terminal, a transmission purpose of the two PD2DSSs, or transmission of a Physical D2D Shared Channel (PD2DSCH).

Advantageous Effects

According to embodiments of the present invention, D2D communication quality may be improved.

According to embodiments of the present invention, an efficient method for transmitting a D2DSS may be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODE FOR INVENTION

Figure 1:
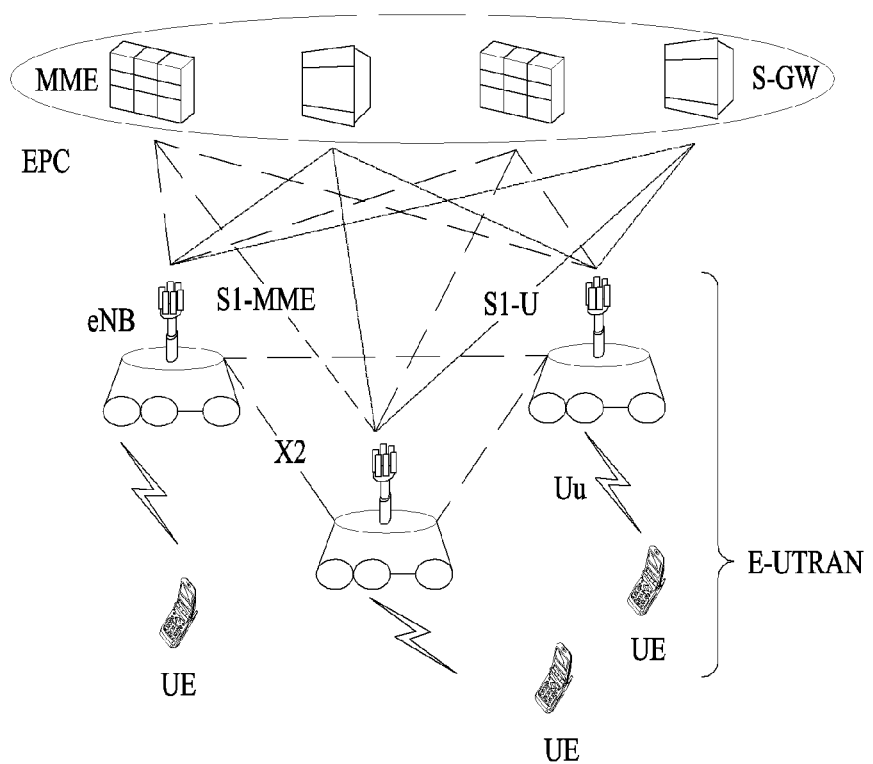
FIG. 1 shows a system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE System Architecture

The architecture of an LTE system, which is an example of a wireless communication system to which the present invention is applicable, will be described with reference to FIG. 1. The LTE system is a mobile communication system that has evolved from UMTS. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an S1 interface.

Figure 2:
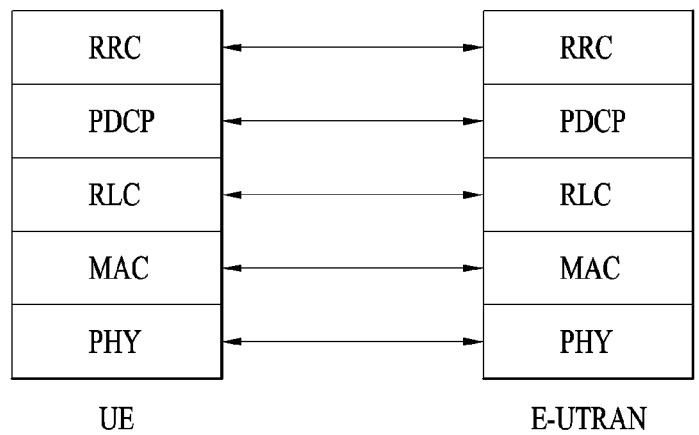
FIG. 2 illustrates a control plane of a radio protocol.
Figure 3:
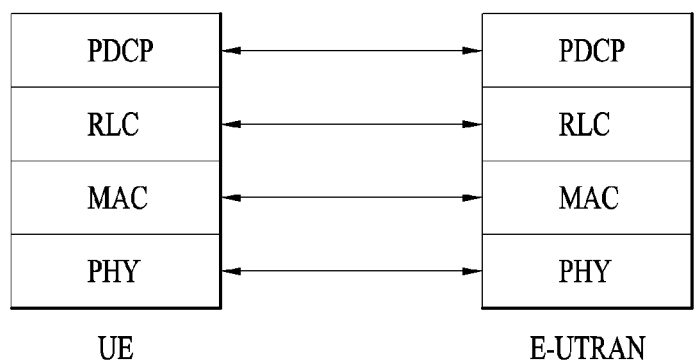
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Media Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of the Open System Interconnection (OSI) reference model widely known in the field of communication systems. These layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Media Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A Resource Structure/Channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
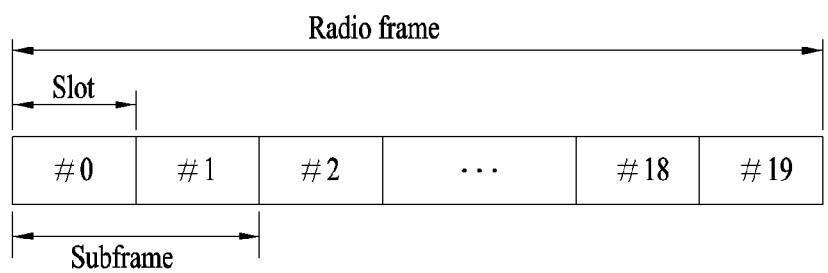
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
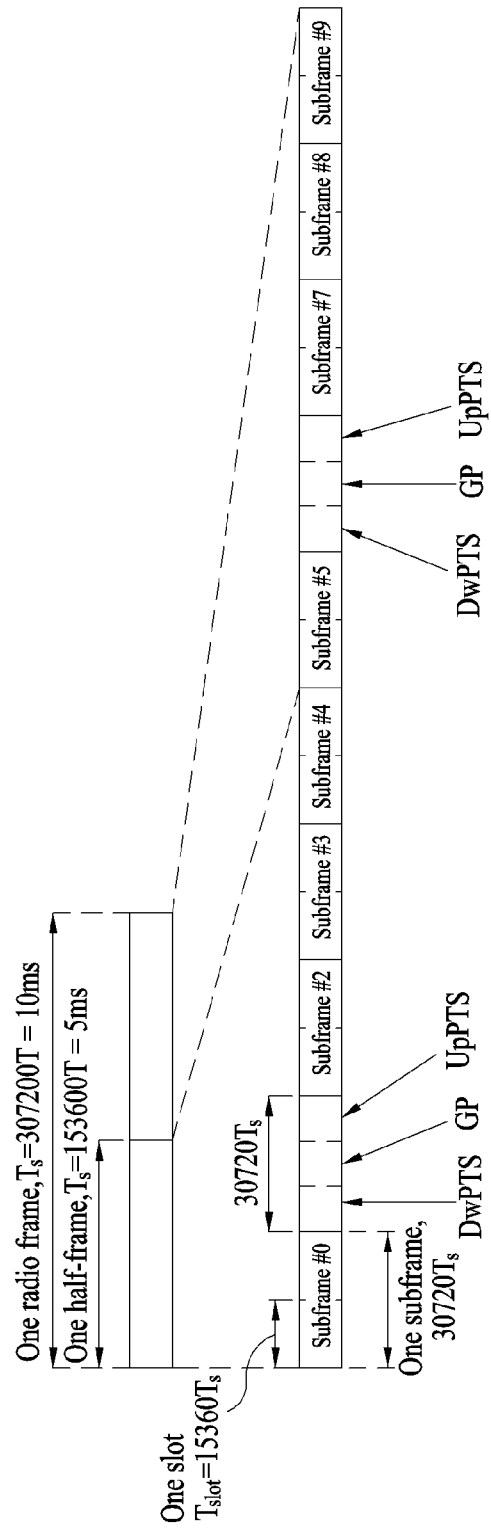
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
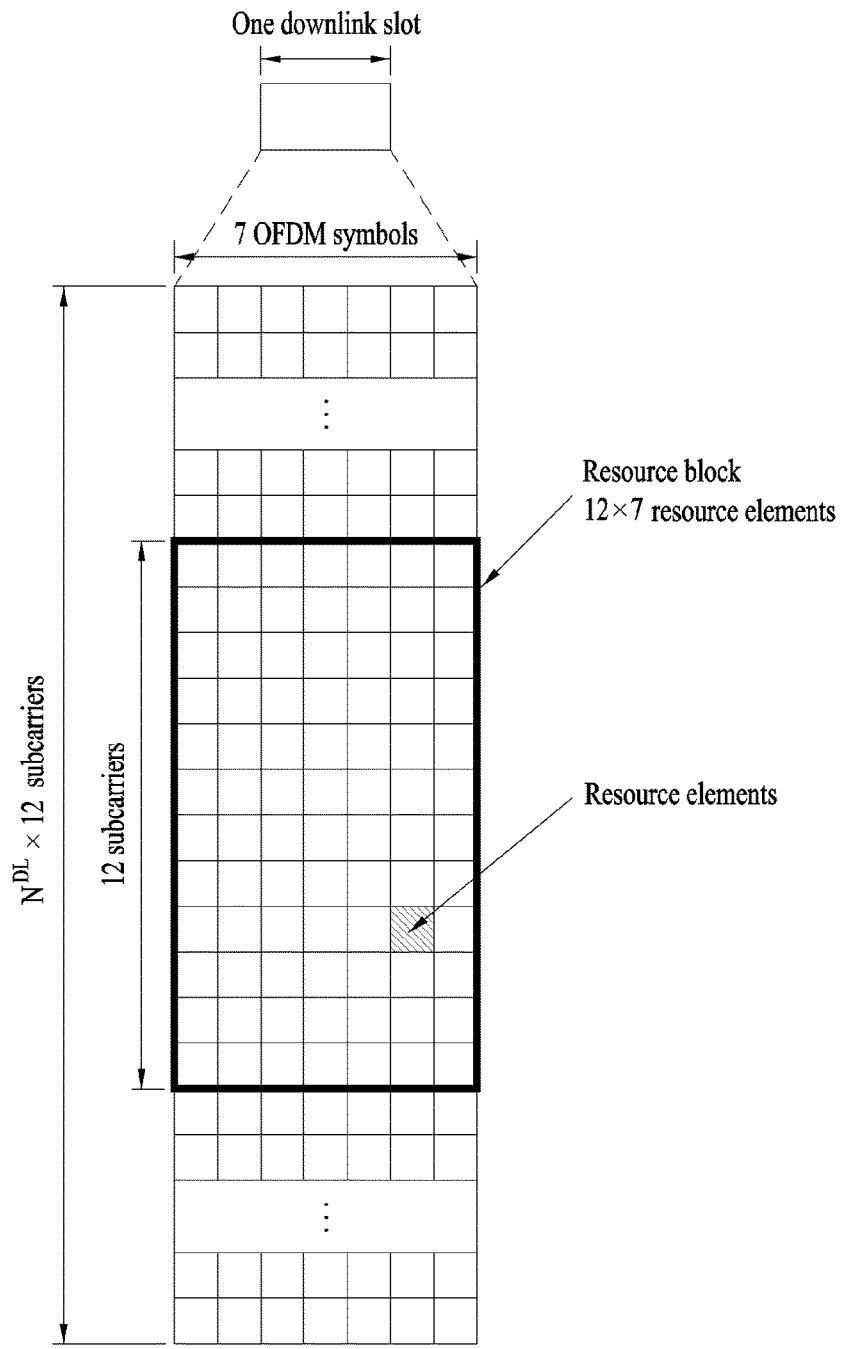
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N_{DL}$ depends on a downlink transmission bandwidth. An uplink slot may have the same structure as a downlink slot.

Figure 7:
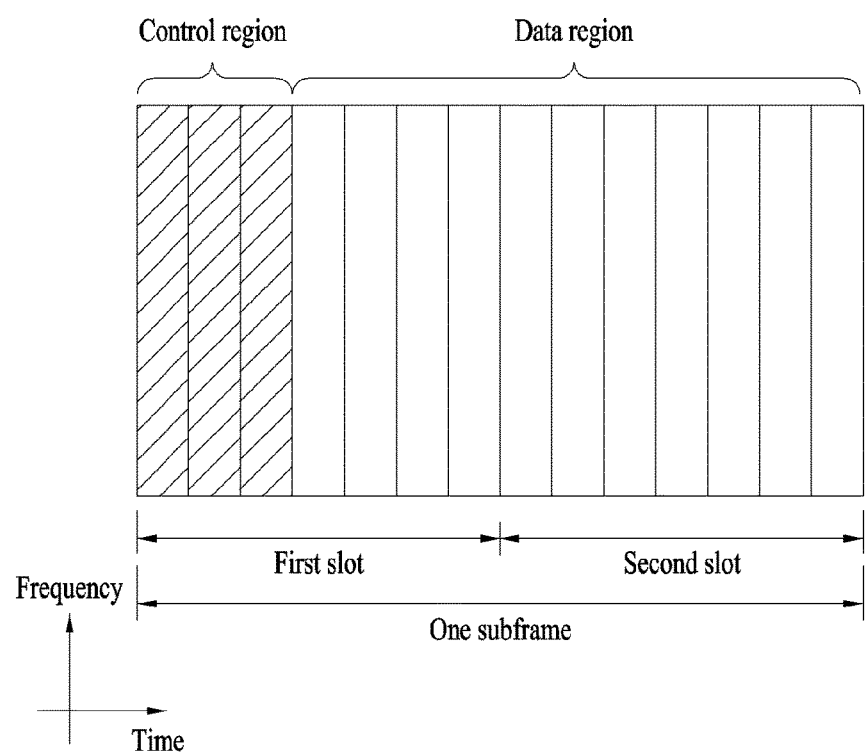
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
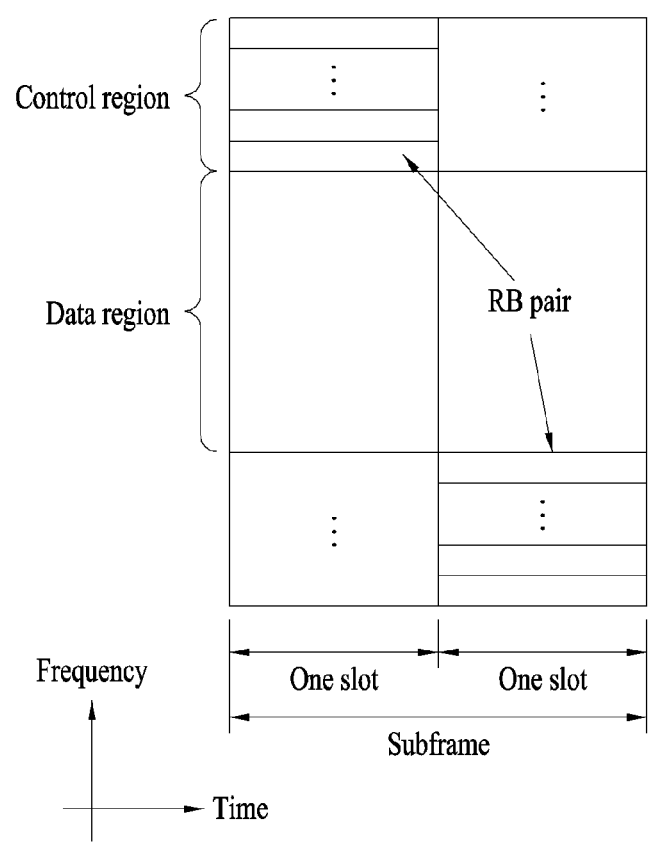
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Hereinafter, a synchronization signal will be described.

When power is turned ON or a UE attempts to access a new cell, the UE performs an initial cell search procedure to acquire time and frequency synchronization with the cell and detect a physical layer cell identity NcellID of the cell. To this end, the UE may be synchronized with an eNB by receiving a synchronization signal, for example, a primary synchronization signal (PSS) and a secondary synchronization signal (SSS) from the eNB, and the UE may acquire information such as a cell identifier, etc.

Specifically, the PSS is used as PSS d(n) by defining a Zadoff-Chu (ZC) sequence having a length of 63 in the frequency domain according to Equation 1 below to acquire time domain synchronization such as OFDM symbol synchronization, slot synchronization, etc. and/or frequency domain synchronization.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In Equation 1, u denotes a ZC root sequence index. In the current LTE system, u is defined as in the following Table 1.

TABLE 1

| $N_{ID}^{(2)}$ | Root index u |
| --- | --- |
| 0 | 25 |
| 1 | 29 |
| 2 | 34 |

Next, the SSS is used to acquire frame synchronization, a cell group ID and/or a CP configuration of a cell (that is, use information of a normal CP or an extended CP), and configured by an interleaving combination of two binary sequences, each of which has a length of 31. In other words, an SSS sequence is d(0), . . . , d(61), and a total length thereof is 62. In addition, the SSS sequence is differently defined depending on whether the SSS sequence is transmitted in subframe #0 or transmitted in subframe #5 as in Equation 2 below. In Equation 2, n is an integer greater than or equal to 0 and less than or equal to 30.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 2]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

More specifically, the synchronization signal is transmitted in each of a first slot of subframe #0 and a first slot of subframe #5 based on 4.6 ms which is a global system for mobile communication (GSM) frame length for ease of inter-radio access technology (RAT) measurement. In particular, the PSS is transmitted on each of a last OFDM symbol of the first slot of subframe #0 and a last OFDM symbol of the first slot of subframe #5, and the SSS is transmitted on each of a second last OFDM symbol of the first slot of subframe #0 and a second last OFDM symbol of the first slot of subframe #5. A boundary of a radio frame may be detected through the SSS. The PSS is transmitted on a last OFDM symbol of the slot, and the SSS is transmitted on an OFDM symbol immediately before the PSS.

An SS may indicate a total of 504 unique physical layer cell IDs through a combination of three PSSs and 168 SSs. In other words, the physical layer cell IDs are grouped into 168 physical layer cell identifier groups, each of which includes three unique identifiers, such that each physical layer cell ID corresponds to a part of only one physical layer cell identifier group. Therefore, a physical layer cell identifier $N^{cell}_{ID}$ is uniquely defined by a number $N^{(1)}_{ID}$ within a range of 0 to 167 indicating the physical layer cell identifier groups and a number $N^{(2)}_{ID}$ within a range of 0 to 2 indicating the physical layer identifiers in the physical layer cell identifier groups. The UE may recognize one of three unique physical layer identifiers by detecting a PSS, and identify one of 168 physical layer cell IDs related to the unique physical layer identifier by detecting an SSS.

The PSS is transmitted every 5 ms, and thus the UE may determine that a subframe corresponds to one of subframe #0 and subframe #5 by detecting a PSS. However, the UE may not specify the subframe between subframe #0 and subframe #5. Therefore, the UE may not recognize a boundary of a radio frame only using the PSS. In other words, frame synchronization may not be acquired only using the PSS. The UE detects the boundary of the radio frame by detecting the SSS which is transmitted twice in one radio frame and transmitted as different sequences.

In this way, for cell search/re-search, the UE may be synchronized with an eNB by receiving a PSS and an SSS from the eNB and may acquire information such as a cell ID, etc. Thereafter, the UE may receive broadcast information in a cell managed by the eNB on a PBCH.

Various embodiments related to D2D communication (also called D2D direct communication) will hereinafter be given. Although D2D communication will hereinafter be described based on 3GPP LTE/LTE-A, it should be noted that D2D communication may also be applied to other communication systems (IEEE 802.16, WiMAX etc.).

D2D Communication Type

D2D communication may be classified into Network coordinated D2D communication and Autonomous D2D communication according to whether D2D communication is executed under network control. The network coordinated D2D communication may be classified into a first type (Data only in D2D) in which D2D communication is used to transmit only data and a second type (Connection Control only in Network) in which the network performs only access control according to the degree of network intervention. For convenience of description, the first type will hereinafter be referred to as a Network Centralized D2D communication type, and the second type will hereinafter be referred to as a distributed D2D communication type.

In the Network Centralized D2D communication type, only data is exchanged between D2D UEs, and connection control between D2D UEs and radio resource allocation (grant message) may be carried out by the network. D2D UEs may transmit and receive data and specific control information using radio resources allocated by the network. For example, HARQ ACK/NACK feedback for data reception between D2D UEs, or Channel State Information (CSI) may not be directly exchanged between the D2D UEs, and may be transmitted to another D2D UE over the network. In more detail, if the network configures a D2D link between D2D UEs and allocates radio resources to the configured D2D link, a transmission D2D UE and a reception D2D UE may perform D2D communication using radio resources. In other words, in the network centralized D2D communication type, D2D communication between D2D UEs may be controlled by the network, and D2D UEs may perform D2D communication using radio resources allocated by the network.

The network in the distributed D2D communication type may perform a more limited role than a network in the network centralized D2D communication type. Although the network of the distributed D2D communication type performs access control between D2D UEs, radio resource allocation (grant message) between the D2D UEs may be autonomously occupied by competition of the D2D UEs without the help of the network. For example, HARQ ACK/NACK or CSI in association with data reception between D2D UEs may be directly exchanged between the D2D UEs without passing through the network.

As illustrated in the above example, D2D communication may be classified into network centralized D2D communication and distributed D2D communication according to the degree of D2D communication intervention of the network. In this case, the network centralized D2D communication type and the distributed D2D communication type are characterized in that D2D access control is performed by the network.

In more detail, the network for use in the network coordinated D2D communication type may configure a D2D link between the D2D UEs scheduled to perform D2D communication, such that connection between the D2D UEs may be constructed. When configuring a D2D link between the D2D UEs, the network may assign a physical D2D link identifier (LID) to the configured D2D link. When plural D2D links are present between the D2D UEs, the physical D2D link ID may be used as an ID for identifying each D2D link.

Unlike the network centralized and distributed D2D communication types, the autonomous D2D communication type may allow the D2D UEs to perform D2D communication freely without the help of the network. That is, unlike the network centralized and distributed D2D communication types, the autonomous D2D communication type may control the D2D UE to autonomously perform access control and radio resource occupancy. If necessary, the network may also provide the D2D UE with D2D channel information capable of being used in the corresponding cell.

D2D Communication Link Configuration

For convenience of description, a UE, which is scheduled to perform or can perform D2D communication including D2D direct communication, will hereinafter be referred to as a D2D UE. If a transmitter and a receiver need to be distinguished from each other, a D2D UE, which is scheduled to transmit or can transmit data to another D2D UE using radio resources allocated to the D2D link during D2D communication, will hereinafter be referred to as a transmission (Tx) D2D UE, or another UE, which is scheduled to receive or can receive data from the Tx D2D UE, will hereinafter be referred to as a reception (Rx) D2D UE. If a plurality of D2D UEs, which is scheduled to receive or can receive data from the Tx D2D UE, is used, the Rx D2D UEs may also be identified by ordinal numerals such as "$1^{st}$ to $N^{th}$". For convenience of description, either a base station (BS) for controlling access between the D2D UEs or allocating radio resources to the D2D link or a node (such as a D2D server, and an access/session management server) located at a network stage will hereinafter be referred to as a network.

D2D UE scheduled to perform D2D communication needs to pre-recognize the presence or absence of neighbor D2D UEs capable of transmitting and receiving data so as to transmit data to another D2D UE through D2D communication. For this purpose, the D2D UE may perform D2D peer discovery. The D2D UE may perform D2D discovery within a discovery interval, and all D2D UEs may share the discovery interval. The D2D UE may monitor logical channels of a discovery region within the discovery interval, and may thus receive D2D discovery signals from other D2D UEs. D2D UEs having received a transmission (Tx) signal from another D2D UE may construct the list of neighbor D2D UEs using a reception (Rx) signal. In addition, D2D UE may broadcast its own information (i.e., ID) within the discovery interval, and other D2D UEs may receive the broadcast D2D discovery signal, such that the presence of the corresponding D2D UE in a D2D communication available range may be recognized.

Information for the D2D discovery may be broadcasted periodically. In addition, a timing of such a broadcast may be determined by a protocol in advance and then informed D2D UEs. The D2D UE may transmit/broadcast a signal during a part of the discovery interval and each D2D UE may monitor signals potentially transmitted by other D2D UEs during the rest of the D2D discovery interval.

For instance, the D2D discovery signal may be a beacon signal. In addition, D2D discovery intervals may include a multitude of symbols (e.g., OFDM symbols). The D2D UE may transmit/broadcast the D2D discovery signal in a manner of selecting at least one symbol in the D2D discovery interval. Moreover, the D2D may transmit a signal corresponding to one tone existing in the symbol selected by the D2D UE.

After the D2D UEs discover each other through the D2D discovery process, the D2D UEs may establish a connection establishment process and transmit traffics to other D2D UEs.

Figure 9:
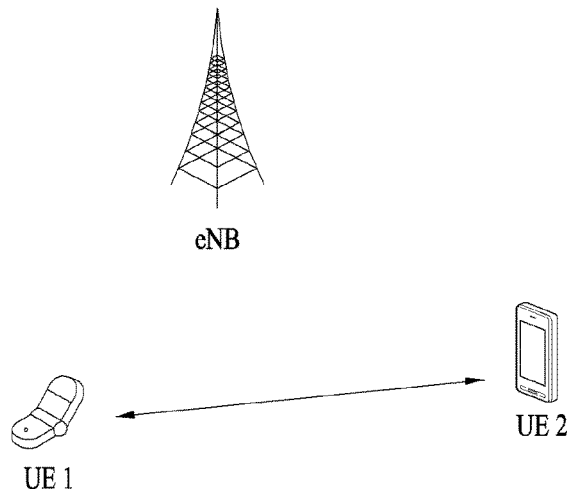
FIG. 9 shows a simplified D2D communication network.

FIG. 9 schematically shows a D2D communication network.

In FIG. 9, D2D communication is performed between UEs (UE1 and UE2) supporting the D2D communication. In general, a UE (user equipment) means a user terminal. However, when a network equipment such as an eNB (evolved Node B) transceives signals according to a communication scheme between UEs (UE1 and UE2), the eNB may also be regarded as a kind of the UE.

The UE1 may be configured to select a resource unit corresponding to specific resources in a resource pool indicating a set of resources and transmit a D2D signal using the corresponding resource unit. The UE2 corresponding to a receiving UE may receive a configuration of the resource pool used by the UE1 to transmit the signal and detect the signal of the UE1 in the corresponding resource pool. For example, when the UE1 is within a coverage of a BS, the BS may inform the resource pool. On the other hand, for example, when the UE1 is out of the coverage of the BS, another UE may inform the UE1 of the resource pool or the UE1 may determine the resource pool based on predetermined resources. Generally, the resource pool may include a plurality of resource units and each UE may select one or a plurality of resource units to transmit its D2D signal.

Figure 10:
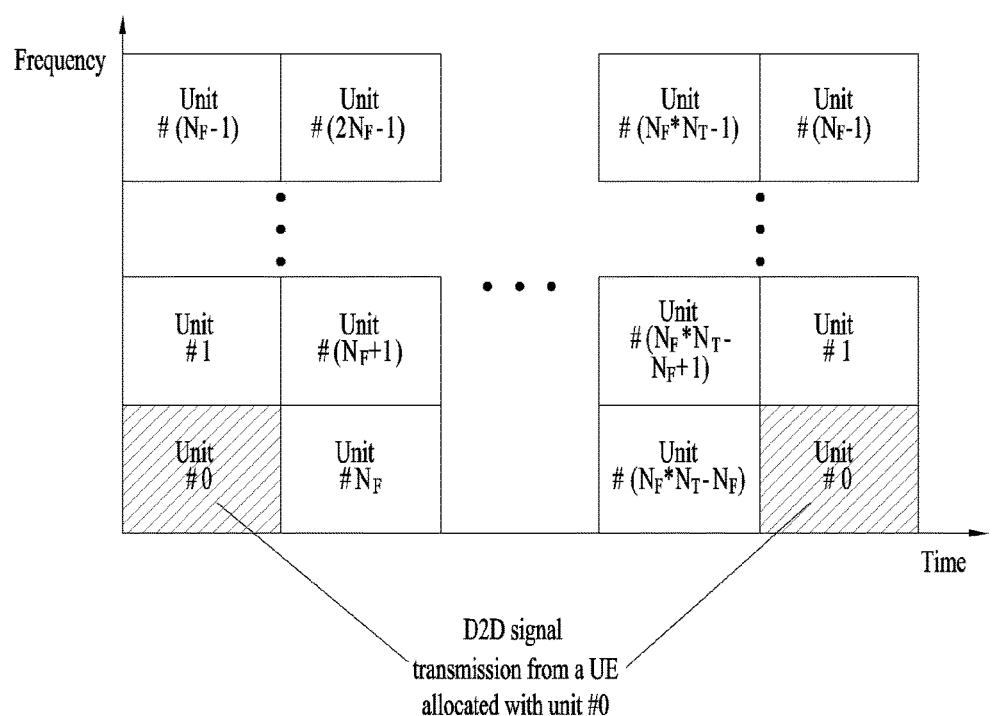
FIG. 10 illustrates configuration of a resource unit according to an embodiment.

FIG. 10 shows an example of a configuration of a resource unit.

In FIG. 10, a vertical axis means frequency resources and a horizontal axis means time resources. In addition, radio resources are divided into $N_T$ resources in the time axis, thereby configuring $N_T$ subframes. In addition, frequency resources are divided into $N_F$ resources in a single subframe, whereby the single subframe may include $N_T$ symbols. Thus, a total of ($N_F*N_T$) resource units may constitute a resource pool.

In an embodiment of FIG. 10, since a D2D transmission resource allocated to unit #0 is repeated every $N_T$ subframes, the resource pool may be repeated with a period of $N_T$ subframes. As shown in FIG. 10, a specific resource unit may be repeated periodically. In addition, to obtain a diversity effect in a time dimension or a frequency dimension, an index of a physical resource unit to which a single logical resource unit is mapped may be changed according to a predetermined pattern. For instance, the logical resource unit may be hopped on the time and/or frequency axes according to the pattern predetermined on the actual physical resource unit. In FIG. 10, the resource pool may mean a set of resource units that can be used by a UE intending to transmit a D2D signal to transmit the D2D signal.

The aforementioned resource pool can be subdivided into several types. For instance, the resource pool may be classified according to a content of the D2D signal transmitted in each resource pool. For example, the content of the D2D signal can be classified as follows and a separate resource pool may be configured for each content.

Scheduling assignment (SA): The SA (or SA information) may include a location of resources used by each transmitting UE for transmitting a following D2D data channel, MCS (modulation and coding scheme) necessary for demodulation of other data channels, and/or a MIMO (multiple input multiple output) transmission scheme. In addition, the SA information may include an identifier of a target user equipment to which the transmitting UE intends to transmit data. A signal containing the SA information may be multiplexed and transmitted with D2D data on the same resource unit. In this case, an SA resource pool may mean a resource pool in which the SA is multiplexed and transmitted with the D2D data.

D2D data channel: The D2D data channel may mean a resource pool used by the transmitting UE for transmitting user data by utilizing the resources designated through the SA. In case that the D2D data channel is multiplexed and transmitted with D2D resource data on the same resource unit, only the D2D data channel except the SA information may be transmitted in the resource pool for the D2D data channel. In other words, resource elements for transmitting the SA information on each individual resource unit in the SA resource pool may be used for transmitting the D2D data in the resource pool for the D2D data channel.

Discovery message: A discovery message resource pool may mean a resource pool for transmitting the discovery message. The transmitting UE may transmit the discovery message containing information such as its ID (identifier)

for the purpose of enabling neighboring UEs to discover the corresponding transmitting UE.

As described above, the D2D resource pool may be classified according to the content of the D2D signal. However, although D2D signals have the same content, different resource pools may be used according to transmitting and receiving properties of the D2D signals. For instance, even in the case of the same D2D data channel or discovery message, different resource pools may be used according to a scheme for determining a transmission timing of the D2D signal (e.g., the D2D signal is transmitted at a reception time of a synchronization reference signal or at a time obtained by applying a timing advance to the reception time), a scheme for assigning a resource (e.g., an eNB designates a resource for transmitting each individual signal for each individual transmitting UE or each individual transmitting UE autonomously selects the resource for transmitting each individual signal from its resource pool), or a signal format (e.g., the number of symbols occupied by each D2D signal in a single subframe or the number of subframes used for transmitting a single D2D signal).

As mentioned in the foregoing description, a UE that intends to transmit data using the D2D communication may transmit its SA information by selecting appropriate resources from the SA resource pool. In addition, for instance, as reference for selecting the SA resource pool, resources not used by a different UE for SA information transmission and/or SA resources interconnected with resources in a subframe where data transmission is not expected after the SA information transmission by the different UE may be selected as the SA resource pool. Moreover, the UE may select SA resources interconnected with data resources where a low level of interference is expected.

In this regard, the resource allocation method for D2D data channel transmission may be divided into two modes.

Mode 1 may mean a method in which a cell (or network) directly designates resources used for Scheduling Assignment (SA) and D2D data transmission to individual D2D transmitting UEs. In this mode, the cell may recognize a UE which transmits a D2D signal and resources that UE use to transmit a signal. However, since designating a D2D resource for every D2D signal transmission may cause excessive signaling overhead, the cell may allocate a plurality of SA and/or data transmission resources to the UE through one-time signaling.

Mode 2 may mean a method in which a cell (or network) indicates a specific SA and/or D2D data-related resource pool to a plurality of D2D transmitting UEs, and an individual D2D transmitting UE selects an appropriate resource and transmits SA and/or data. In this case, it is difficult for the cell to accurately identify a resource which the UE uses for D2D transmission.

Meanwhile, the resource allocation method for discovery (DS) message transmission may be divided into two types.

Type 1 may refer to a DS procedure where a resource for transmitting a DS signal is allocated on a non-UE specific basis.

In addition, Type 2 may refer to a DS procedure where a UE-specific DS signal transmission resource is allocated. Type 2 may include Type 2A in which resources are allocated at the time of transmission of each specific DS signal and Type 2B in which resources for DS signals are semi-persistently allocated.

Figure 11:
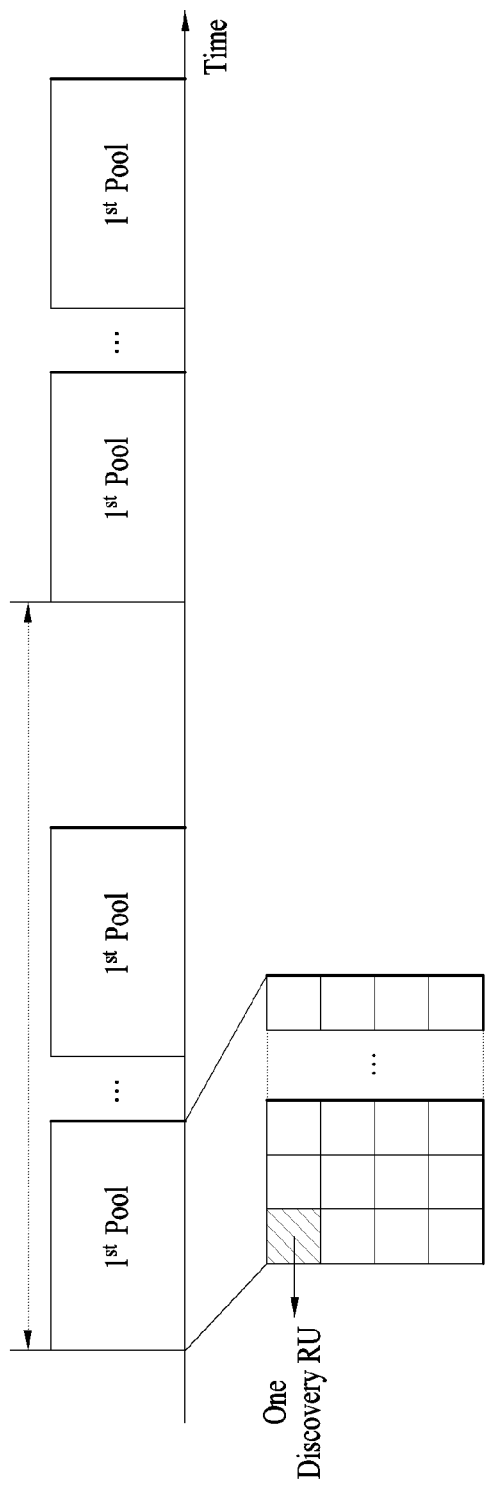
FIG. 11 illustrates a resource pool related to a periodic discovery message according to an example.

FIG. 11 illustrates a resource pool (e.g., discovery resource pool) related to a periodic discovery message according to one example.

In the example of FIG. 11, the period in which the discovery resource pool appears may be referred to as a discovery resource pool period. As shown in FIG. 11, one or more discovery resource pools may exist within the discovery resource pool period. For example, of the discovery resource pools within the discovery resource pool period, particular discovery resource pool(s) may be defined as discovery send/receive resource pool(s) associated with a serving cell, and the other (or remaining) discovery resource pool(s) may be defined as discovery receive resource pool(s) associated with a neighboring cell.

Meanwhile, the D2D UEs (D2D transmitting UE and D2D receiving UE) may use a D2DSS (D2D Synchronization Signal) to maintain/establish synchronization between the D2D UE and the eNB and/or synchronization between the D2D UEs.

An in-coverage UE within the network coverage may perform communication, assuming that the downlink timing of the corresponding cell is reference timing. On the other hand, an out-of-coverage UE located outside the network coverage may perform synchronization based on the D2DSS (D2D Synchronization Signal) transmitted by the in-coverage UE. The out-of-coverage UE may also perform synchronization based on the D2DSS transmitted from a specific out-of-coverage UE (e.g., a synchronization source) in the vicinity. If the D2DSS is not detected or the receive power of the detected D2DSS is lower than a predetermined value (for example, xdBm), the UE may operate as a synchronization source to directly transmit the D2DSS. In this case, for example, the UE may independently determine a transmission timing reference.

Similar to the synchronization signal described above in relation to the LTE system, the D2DSS may be divided into a Primary D2DSSS (PD2DSS) and a Secondary D2DSS (SD2DSS). The D2DSS may be designed based on the legacy downlink PSS/SSS. In this case, the PD2DSS may be configured based on a Zadoff-Chu (ZC) sequence used for generation of the PSS, and the SD2DSS may be configured based on an M-sequence (maximum length sequence). In addition, the number of root indexes of the sequence used for the PD2DSS may be set to be smaller than the number of root indexes of the sequence used for the SD2DSS. For example, when the signals are configured in the same manner as the PSS/SSS of the legacy LTE system, the number of root indexes of PD2DSS may be set to 3 and the number of root indexes of SD2DSS may be set to 168.

The PD2DSS may be mapped on two OFDM symbols in one subframe and transmitted. In this case, Zadoff-Chu ZC sequences with different root indexes on the respective OFDM symbols may be transmitted. When different ZC sequences are transmitted on two OFDM symbols, the following embodiments may be applied.

Embodiment 1

The two PD2DSSs may use root index a and root index b (for example, a and b are integers greater than or equal to 1), respectively. In this case, the status information on the UE transmitting the PD2DSS may be indicated according to which of the PD2DSS using root index a and the PD2DSS using root index b is transmitted first in the subframe in which the two PD2DSSs are transmitted. For example, whether the UE is an in-coverage UE or an out-of-coverage UE may be identified according to the transmission order of the PD2DSS using root index a and the PD2DSS using root index b. For example, the UE may be an in-coverage UE if the PD2DSS using root index a is transmitted from the UE first, and may an out-of-coverage UE if the PD2DSS using root index b is transmitted from the UE first. In order to reduce implementation complexity, root index a and root index b may be set to satisfy a+b=63.

Embodiment 2

The two PD2DSSs may use root index a and root index b (for example, a and b are integers greater than or equal to 1), respectively. In this case, the transmission purpose of the PD2DSSs may be classified according to the transmission order of the PD2DSS using root index a and the PD2DSS using root index b. For example, the transmission of the PD2DSS may be intended for D2D communication or D2D discovery. For example, D2D communication may include transmitting and receiving a D2D signal, excluding signals associated with D2D discovery. For example, if the PD2DSS using root index a is transmitted first, it may be intended for D2D communication. In order to reduce implementation complexity, root index a and root index b may be set to satisfy a+b=63.

Embodiment 3

The two PD2DSSs may use root index a and root index b (for example, a and b are integers greater than or equal to), respectively. In this case, whether to transmit a Physical D2D Shared Channel (PD2DSCH) may be indicated depending on the transmission order of the PD2DSS using root index a and the PD2DSS using root index b. For example, if the PD2DSS using root index a is transmitted first, transmission of the PD2DSCH may follow. In order to reduce implementation complexity, root index a and root index b may be set to satisfy a+b=63.

In Embodiments 1 to 3 described above, the transmission order of the PD2DSS using root index a and the PD2DSS using root index b may be identified by the positions of symbols to which the PD2DSS using root index a and the PD2DSS using root index b are mapped. Therefore, in Embodiments 1 to 3 described above, the transmission order may be replaced with the positions of the mapped symbols.

Embodiment 4

The two PD2DSSs may be configured to use one of the two root index sets. For example, the two PD2DSSs may use root index a and root index b (for example, a and b are integers greater than or equal to 1), respectively. For example, the two PD2DSSs may use root index c and root index d (for example, c and d are integers greater than or equal to 1), respectively. In this case, for example, a and b may constitute one root index set, c and d may constitute another root index set, and a, b, c and d may have different values.

In this case, depending on which root index set is used by the PD2DSSs, the PD2DSS transmitting UE may be identified as an in-coverage UE or an out-of-coverage UE. For example, if the PD2DSSs use root indexes a and b, the UE may be an in-coverage UE. For example, if the PD2DSSs use root indexes c and d, the UE may be an out-of-coverage UE.

In addition, in order to reduce implementation complexity, the root indexes a, b, c, and d may be set to satisfy, for example, a+b=63 and/or c+d=63. For example, in order to reduce implementation complexity, root indexes a, b, c, and d may be set to satisfy a+c=63 and/or b+d=63.

Embodiment 5

The two PD2DSSs may be configured to use one of two sets of root indexes. For example, the two PD2DSSs may use root index a and root index b (e.g., a and b are integers greater than or equal to 1), respectively. For example, the two PD2DSSs may use root index c and root index d (for example, c and d are integers greater than or equal to 1), respectively. In this case, for example, a and b may constitute one root index set, c and d may constitute another root index set, and a, b, c and d may have different values.

In this case, depending on which root index set the PD2DSSs use, the transmission purpose of the PD2DSS may be D2D communication or D2D discovery. For example, D2D communication may include transmitting and receiving a D2D signal, excluding signals associated with D2D discovery. For example, if the PD2DSSs use root indexes a and b, the PD2DSSs may be intended for D2D communication. For example, if the PD2DSSs use root indexes c and d, the PD2DSSs may be intended for D2D discovery.

For example, in order to reduce implementation complexity, root indexes a, b, c, and d may be set to satisfy a+b=63 and/or c+d=63. For example, root indexes a, b, c, and d may be set to satisfy a+c=63 and/or b+d=63 in order to reduce implementation complexity.

Embodiment 6

The two PD2DSSs may be configured to use one of two sets of root indexes. For example, the two PD2DSSs may use root index a and root index b (e.g., a and b are integers greater than or equal to 1), respectively. For example, the two PD2DSSs may use root index c and root index d (for example, c and d are integers greater than or equal to 1), respectively. In this case, for example, a and b may constitute one root index set, c and d may constitute another root index set, and a, b, c and d may have different values.

In this case, whether or not to transmit a Physical D2D Shared Channel (PD2DSCH) may be indicated depending on which root index set is used by the PD2DSSs. For example, if the PD2DSSs use root indexes a and b, this may mean that transmission of the PD2DSCH follows. If the PD2DSSs use root indexes c and d, this may mean that transmission of the PD2DSCH does not follow.

For example, in order to reduce implementation complexity, root indexes a, b, c, and d may be set to satisfy a+b=63 and/or c+d=63. For example, root indexes a, b, c, and d may be set to satisfy a+c=63 and/or b+d=63 in order to reduce implementation complexity.

The above-described embodiments may be implemented independently, or a combination of some of the embodiments may be implemented. The above-described proposed schemes may be defined such that they are limitedly applied only in the FDD system (or TDD system) environment. In addition, some or all of the above embodiments may be applied only to Public Safety (PS) discovery/communication and/or non-PS discovery/communication. In addition, in the above-described embodiments, the term Device-to-Device (D2D) may be replaced with "sidelink".

Figure 12:
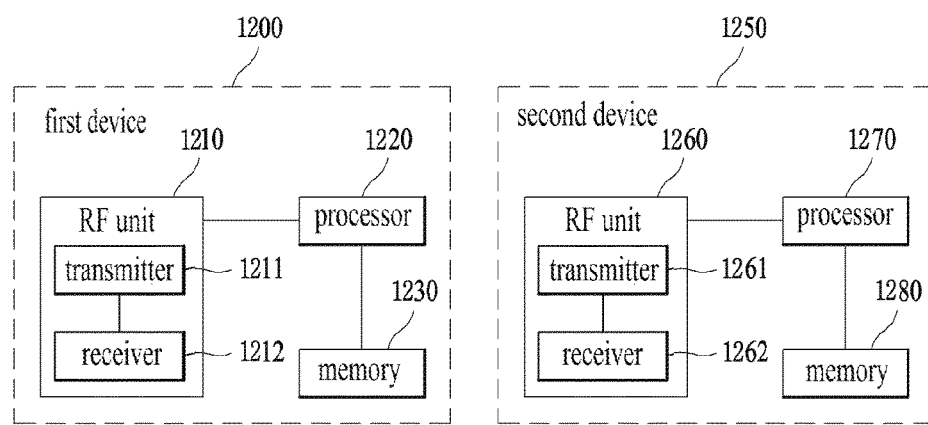
FIG. 12 is a schematic diagram illustrating devices according to an embodiment of the present invention.

FIG. 12 schematically illustrates configuration of devices to which the embodiments of the present invention illustrated in FIGS. 1 to 11 may be applied according to an embodiment of the present invention.

In FIG. 12, each of a first device 1200 and a second device 1250, which are D2D UEs, includes a radio frequency (RF) unit 1210, 1260, a processor 1220, 1270, and, optionally, a memory 1230, 1280. Although FIG. 15 shows configuration of two D2D UEs, a plurality of D2D UEs may establish a D2D communication environment.

Each of the RF unit 1230 and 1260 may include a transmitter 1211, 1261 and a receiver 1212, 1262. The transmitter 1211 and the receiver 1212 of the first device 1200 may be configured to transmit and receive signals to and from the second device 1250 and other D2D UEs, and the processor 1220 may be functionally connected to the transmitter 1211 and the receiver 1212 to control the transmitter 1211 and the receiver 1212 to transmit and receive signals to and from other devices. Meanwhile, the first device 1200 and/or the second device 1250 may be an eNB.

The processor 1220 may perform various kinds of processing on a signal to be transmitted, and then transmit the signal to the transmitter 1211, and process a signal received by the receiver 1212. If necessary, the processor 1220 may store, in the memory 1230, information contained in an exchanged message.

With the above-described structure, the first device 1200 may perform the methods of the various embodiments of the present invention described above. For example, each signal and/or message may be transmitted and received using a transmitter and/or receiver of the RF unit, and each operation may be performed under control of the processor.

Meanwhile, although not shown in FIG. 12, the first device 1200 may include various additional elements according to device application type. For example, if the first device 1200 is for intelligent metering, the first device 1200 may include an additional element for power measurement and the like. The operation of power measurement may be under control of the processor 1220 or a separately configured processor (not shown).

For example, the second device 1250 may be an eNB. In this case, the transmitter 1261 and receiver 1262 of the eNB may be configured to transmit and receive signals to and from other eNBs, D2D servers, D2D devices, and the processor 1270 may be functionally connected to the transmitter 1261 and receiver 1262 and may be configured to control the process of the transmitter 1261 and the receiver 1262 transmitting and receiving signals to and from other devices. In addition, the processor 1270 may perform various kinds of processing on a signal to be transmitted, transmit the signal to the transmitter 1261, and process a signal received by the receiver 1262. If necessary, the processor 1270 may store, in the memory 1230, information contained in an exchanged message. With the above-described structure, the eNB 1250 may perform the methods of the various embodiments described above.

In FIG. 12, the processors 1220 and 1270 of the first device 1210 and the second device 1250 respectively instruct operations for the first device 1210 and the second device 1250 (for example, control, adjustment, management, etc.). Each of the processors 1220 and 1270 may be connected to the memory 1230, 1280 that stores program code and data. The memories 1230 and 1280 may be connected to the processors 1220 and 1270 to store operating systems, applications, and general files.

The processors 1220 and 1270 of the present invention may be referred to as a controller, a microcontroller, a microprocessor, a microcomputer, or the like. Meanwhile, the processors 1220 and 1270 may be implemented by hardware, firmware, software, or a combination thereof. When embodiments of the present invention are implemented using hardware, the processors 1520 and 1570 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processor or may be stored in the memory and driven by the processor.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The embodiments of the present invention as described above may be applied to various mobile communication systems.

What is claimed is:

1. A method for transmitting a Device-to-Device (D2D) synchronization signal in a wireless communication system, the method performed by a user equipment (UE) and comprising:
    generating a first Primary D2D Synchronization Signal (PD2DSS) based on a first root index;
    generating a second PD2DSS based on a second root index different from the first root index; and
    transmitting the generated first PD2DSS and the generated second PD2DSS via different radio resources in one subframe,
    wherein a transmission order of the first and second PD2DSS indicates that a transmission purpose is D2D communication when the first PD2DSS is transmitted earlier than the second PD2DSS,
    wherein the transmission order indicates that the transmission purpose is D2D discovery when the second PD2DSS is transmitted earlier than the first PD2DSS.

2. The method according to claim 1, wherein a sum of the first root index and the second root index is 63.

3. A method for transmitting a Device-to-Device (DD) synchronization signal in a wireless communication system, the method performed by a user equipment (UE) and comprising:
    generating two Primary D2D Synchronization Signals (PD2DSSs) based on a first root index set or a second root index set; and
    transmitting the generated two PD2DSSs via different radio resources in one subframe,
    wherein the first root index set comprises a first root index and a second root index,
    wherein the second root index set comprises a third root index and a fourth root index, wherein the two PD2DSSs are generated based on the first root index set when a transmission purpose is D2D communication, and wherein the two PD2DSSs are generated based on the second root index set when the transmission purpose is D2D discovery.

4. The method according to claim 3, wherein a sum of the first root index and the second root index is 63.

5. The method according to claim 3, wherein a sum of the third root index and the fourth root index is 63.

6. A user equipment (UE) for transmitting a Device-to-Device (D2D) synchronization signal, the UE comprising:

a transceiver configured to transmit and receive a radio signal; and a processor configured to:

generate a first Primary D2D Synchronization Signal (PD2DSS) based on a first root index;

generate a second PD2DSS based on a second root index different from the first root index; and control the transceiver to transmit the generated first PD2DSS and the generated second PD2DSS via different radio resources in one subframe, wherein a transmission order of the first and second PD2DSS indicates that a transmission purpose is D2D communication when the first PD2DSS is transmitted earlier than the second PD2DSS, wherein the transmission order indicates that the transmission purpose is D2D discovery when the second PD2DSS is transmitted earlier than the first PD2DSS.

7. The UE according to claim 6, wherein a sum of the first root index and the second root index is 63.

8. A user equipment (UE) for transmitting a Device-to-Device (D2D) synchronization signal, the UE comprising:

a transceiver configured to transmit and receive a radio signal; and a processor configured to:

generate two Primary D2D Synchronization Signals (PD2DSSs) based on a first root index set or a second root index set; and control the transceiver to transmit the generated two PD2DSS via different radio resources in one subframe, wherein the first root index set comprises a first root index and a second root index, wherein the second root index set comprises a third root index and a fourth root index, wherein the two PD2DSSs are generated based on the first root index set when a transmission purpose is D2D communication, and wherein the two PD2DSSs are generated based on the second root index set when the transmission purpose is D2D discovery.

9. The UE according to claim 8, wherein a sum of the first root index and the second root index is 63.

10. The UE according to claim 8, wherein a sum of the third root index and the fourth root index is 63.

* * * * *